United States Patent
Acquaviva

(10) Patent No.: US 7,714,530 B2
(45) Date of Patent: May 11, 2010

(54) SYSTEM AND METHOD FOR CONTROLLING A SYNCHRONOUS ELECTRIC MOTOR, PARTICULARLY FOR HOUSEHOLD APPLIANCES

(75) Inventor: Sebastiano Acquaviva, Pino Torinese (IT)

(73) Assignee: Emerson Appliance Motors Europe S.R.L., Turin (IT)

( * ) Notice: Subject to any disclaimer, the term of this patent is extended or adjusted under 35 U.S.C. 154(b) by 329 days.

(21) Appl. No.: 11/989,119

(22) PCT Filed: Jul. 24, 2006

(86) PCT No.: PCT/IB2006/052528

§ 371 (c)(1), (2), (4) Date: Jan. 17, 2008

(87) PCT Pub. No.: WO2007/013020

PCT Pub. Date: Feb. 1, 2007

(65) Prior Publication Data

US 2009/0033261 A1 Feb. 5, 2009

(30) Foreign Application Priority Data

Jul. 25, 2005 (IT) .......................... TO2005A0509

(51) Int. Cl.
*H02P 3/18* (2006.01)
*H02P 6/00* (2006.01)
*H02P 23/00* (2006.01)

(52) U.S. Cl. .................... 318/715; 318/700; 318/400.11

(58) Field of Classification Search ................. 318/715, 318/700, 400.11

See application file for complete search history.

(56) References Cited

U.S. PATENT DOCUMENTS 6,392,372 B1 5/2002 Mays, II
2002/0097014 A1 7/2002 Kawagoshi

FOREIGN PATENT DOCUMENTS

| EP | 0207430 | 1/1987 |
| EP | 0287984 | 10/1988 |
| WO | 00/57544 | 9/2000 |
| WO | 01/82465 | 11/2001 |

*Primary Examiner*—Bentsu Ro
*Assistant Examiner*—Erick Glass
(74) *Attorney, Agent, or Firm*—Harness, Dickey & Pierce, P.L.C.

(57) ABSTRACT

The system (ECS) comprises a rectifier circuit (RC) to supply a direct current voltage (VB) as output; a driver circuit (DC) which is connected to a rectifier circuit (RC) and includes a plurality of controlled switches (SW1-SW4) which can permit passage of a current in the stator winding (W) selectively in one direction and in the opposite direction; a sensor (PS) which can supply a signal (H) which is indicative of the angular position of the rotor (R); and a control circuit (CC) which is designed to receive a signal (RS) which is indicative of the speed of rotation required (ωref) for the motor (M), and is connected to the position sensor (PS). The control circuit is designed to generate, from the passage of the rotor (R) to a predetermined position, a counting signal (N) which is a function of the time (t), and to reset this signal (N) when it reaches a predetermined value (Nref) corresponding to the speed of rotation required (ωref) for the motor (M); and then to control the driver circuit (DC) selectively on the basis of the position signal (H) of the rotor or on the basis of the counting signal (N), when the speed of rotation (Δ) of the motor (M) is respectively lesser and greater than the speed required (Δref).

10 Claims, 4 Drawing Sheets

SYSTEM AND METHOD FOR CONTROLLING A SYNCHRONOUS ELECTRIC MOTOR, PARTICULARLY FOR HOUSEHOLD APPLIANCES

CROSS-REFERENCE TO RELATED APPLICATIONS

This patent application is a U.S. national stage filing under 35 U.S.C. §371 of International Application No. PCT/IB2006/052528 filed Jul. 24, 2006, and claims priority of Italian Application No. TO2005A000509 filed Jul. 25, 2005. The disclosures of the applications identified in this paragraph are incorporated herein by reference in their entireties.

The present invention relates to a system and a method for controlling a synchronous electric motor, which can be used in particular in household appliances, for example for actuation of a hydraulic pump in a dishwasher machine.

The washing pumps of a dishwasher machine are typically actuated by an electric motor of the synchronous type, for example of the type described in European patent EP 0 207 430-B1 and in European patent EP 0 287 984 B1. A hydraulic washing pump of this type for dishwashers in operation has a hydraulic load which typically varies cyclically. Consequently, the pump has pulse-type operation, and this involves generation of noise and substantial stresses on the pump.

An object of the present invention is to propose a system and a method for controlling a synchronous electric motor which makes it possible to eliminate the above-described disadvantages.

These objects and others according to the invention are achieved by means of a control system, the main characteristics of which are defined in the attached claim 1, and using a control method according to claim 6.

Further characteristics and advantages of the invention will become apparent from the following detailed description provided purely by way of non-limiting example, with reference to the attached drawings, in which.

Figure 1:
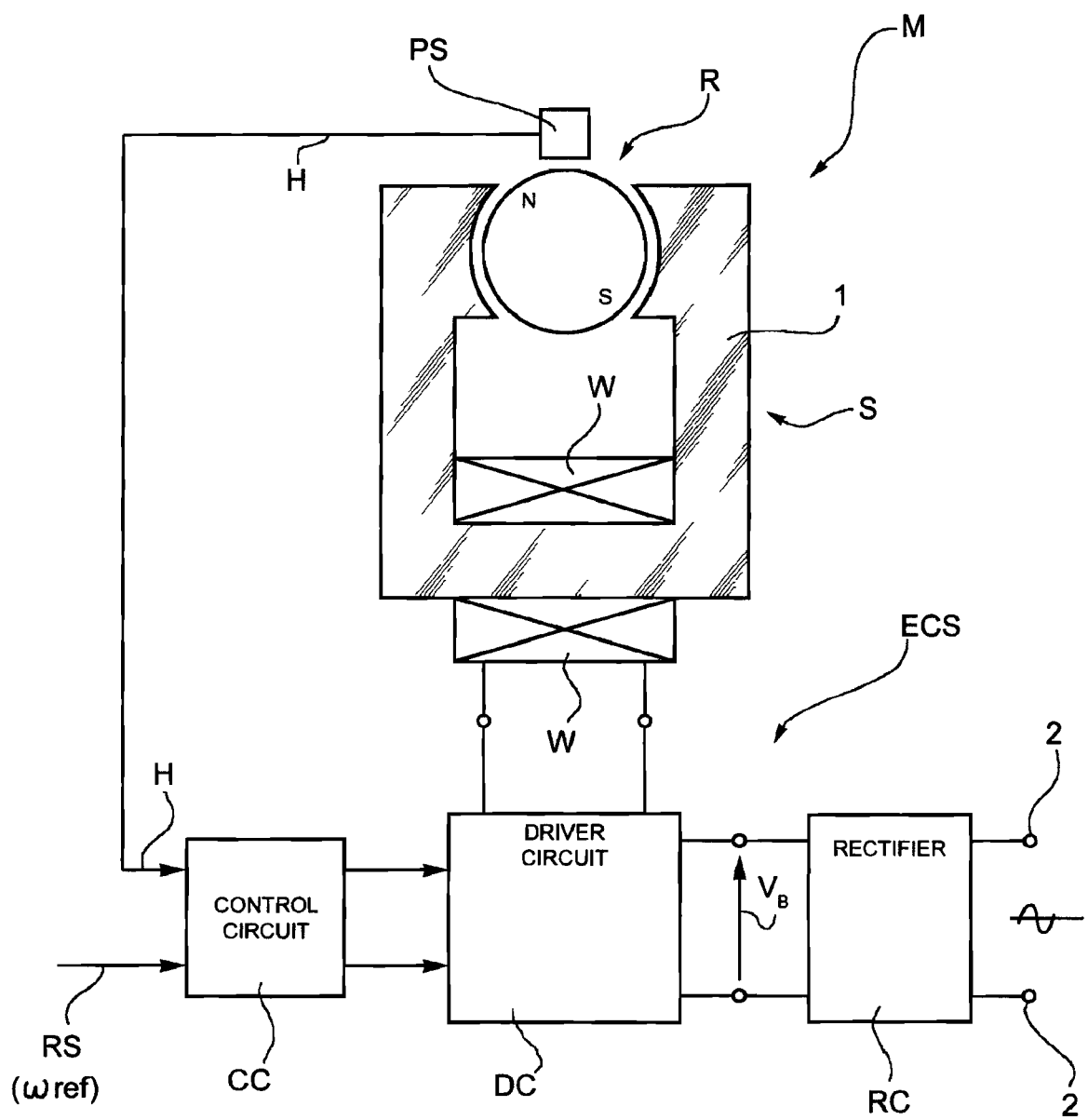
FIG. 1 is a representation of a synchronous electric motor with which there is associated a control system according to the present invention.

In FIG. 1, M indicates as a whole an electric motor with which there is associated an electronic control system indicated as ECS as a whole.

The electric motor M comprises a stator S, including a set of laminations 1 substantially in the shape of a "U", provided with a winding W and a rotor R with permanent magnets.

The control system ECS which is associated with the motor M comprises an electric position sensor PS associated with the rotor R. This sensor is for example a Hall-effect sensor, which in operation can supply an alternating electric position sensor, typically with a square wave, which for example has a development according to the wave forms indicated by H in FIGS. 3 and 4.

The sensor PS is disposed in a position in such a way that the signal H which it supplies at output has level switching, for example from low level to high level, when the rotor goes to a predetermined angular reference position.

With reference to FIG. 1, the control system ECS additionally comprises a rectifier circuit RC, for example of the half-wave double-bridge type, with an input 2 which is designed to be connected to an alternating current power source, such as the mains supply at 50 or 60 Hz, in order to supply a predetermined direct current voltage $V_B$ as output.

Figure 2:
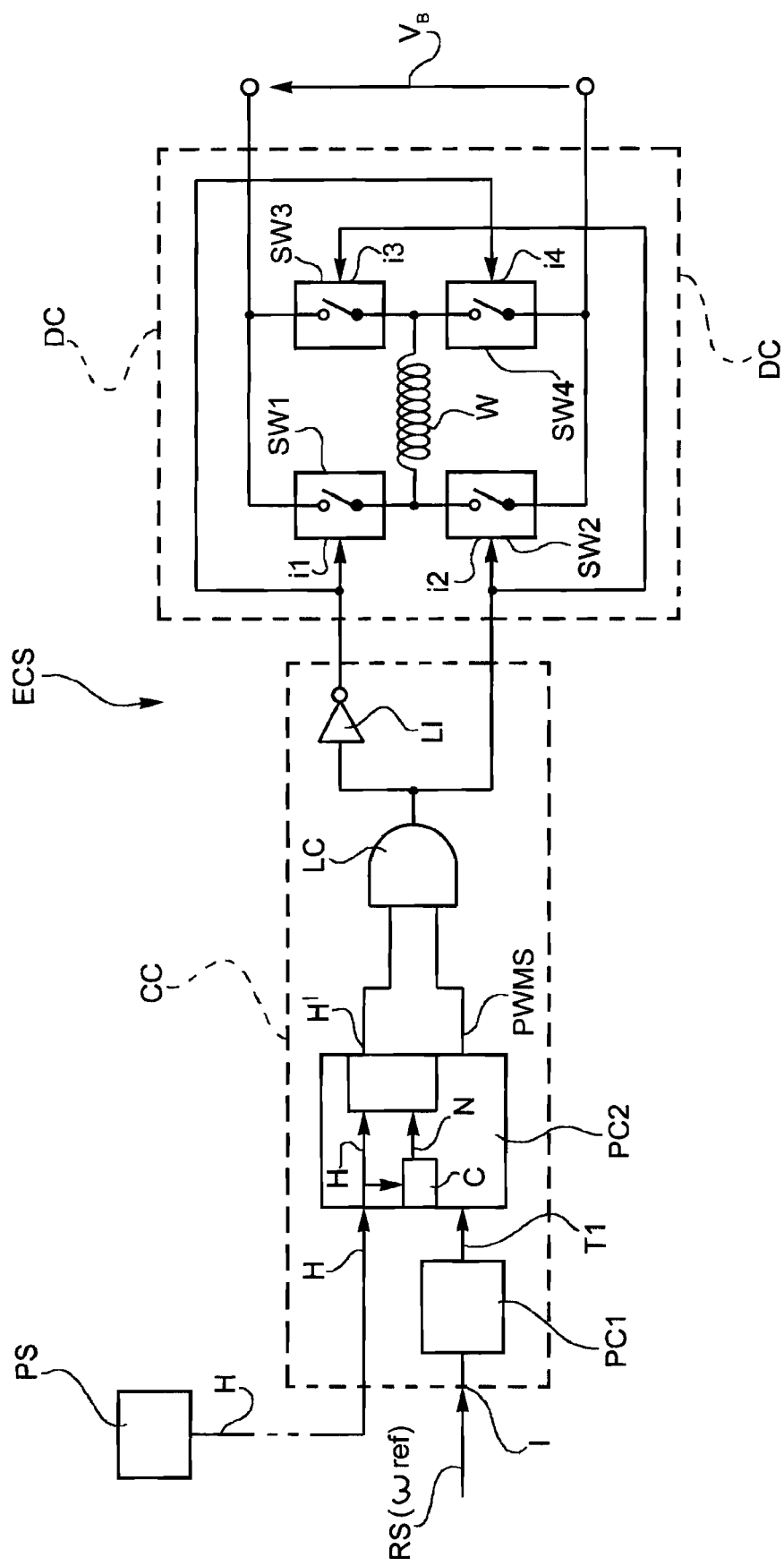
FIG. 2 is a more detailed wiring diagram of the control system according to FIG. 1.

The control system ECS additionally comprises a driver circuit DC, which, as shown in FIG. 2, is advantageously of the so-called "H" bridge type. This control circuit is connected to the output of the rectifier circuit RC, as well as to the stator winding W, and includes a plurality of controlled electronic switches SW1-SW4, such as, for example, transistors of the MOSFET type. The arrangement and control of the said switches SW1-SW4 are in such a way that they can permit passage of a current into the stator winding W selectively in one direction and in the opposite direction.

The switches SW1-SW4 have respective control inputs i1-i4 which are connected to the outputs of a control circuit which is indicated as CC as a whole in FIGS. 1 and 2.

In the embodiment illustrated by way of example in FIG. 2, the control circuit CC has an input I which is designed to receive a signal RS which is indicative of the speed of rotation Δref required for the motor M.

The control circuit CC comprises a first processing circuit PC1, which receives as input the signal RS, and supplies as output a signal T1, the frequency (period) of which is proportional (inversely proportional) to the speed $\omega_{ref}$ required for the motor M.

The control circuit CC comprises a second processing circuit PC2 which has two inputs, to which in operation there are applied the rotor position signal H and the signal T1 which is indicative of the speed of rotation $\omega_{ref}$ required for the motor M.

The processing circuit PC2 is designed to provide as output two signals, indicated respectively by H' and PWMS in FIG. 2, which are applied to the inputs of a logic circuit LC of the AND type.

As will become more apparent hereinafter, the signal H' is a square-wave signal, used to control the switches SW1-SW4 of the DC bridge driver circuit.

The signal PWMS is a signal with a modulated pulse width (duration), and is used to control the absolute value of the voltage applied in operation to the stator winding W.

The output of the logic circuit LC is connected to the control inputs i1 and i4 of the switches SW1 and SW4 via a logic inverter LI; this output is also connected directly to the control inputs i2 and i3 of the switches SW2 and SW3.

The above-described control system ECS operates substantially as follows.

When the electric motor M is started up, and until the first level switching of the signal H supplied by the position sensor PS takes place, the processing circuit PC2 supplies as output a signal H' equal to H, i.e. it controls the stator W of the motor M (via the circuits LC, LI and the DC bridge circuit), on the basis of the signal supplied by the position sensor PS associated with the rotor. In addition, the circuit PC2 supplies as output a signal PWMS, which has a duty cycle with a predetermined value dcmin, in such a way that the voltage applied to the stator winding W is substantially equal to the product $V_B \times dcmin$, where $V_B$ is the output voltage of the rectifier circuit RC.

These conditions continue to apply until the first level switching of the signal H of the position sensor PS associated with the rotor takes place.

When the first switching of the signal H takes place (instant $t_1$ in FIG. 3), a counter C inside the circuit PC2 (FIG. 2) starts counting, which for example is incremental, and varies linearly with the time t, until the value counted N reaches a value $N_{ref}$ which is inversely proportional to the speed $\omega_{ref}$ required for the motor M.

Figure 3:
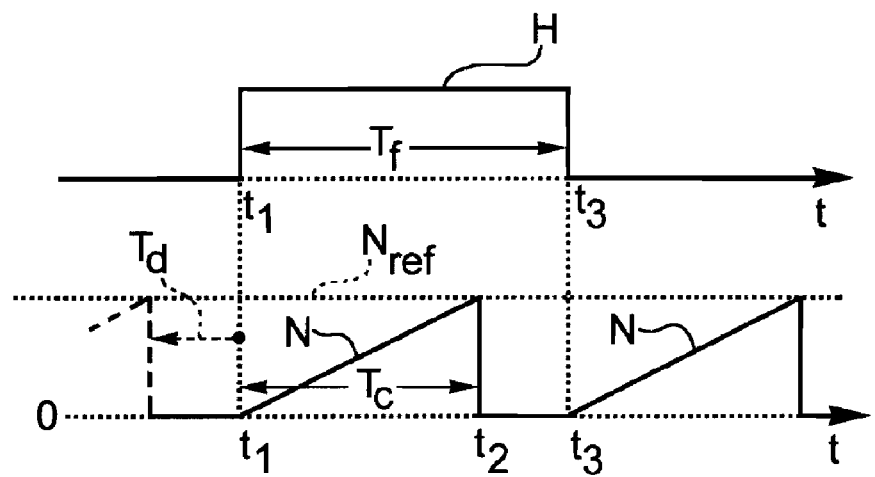
FIGS. 3 and 4 are diagrams which, according to the time t recorded on the x-axis, have developments which exemplify signals generated in the control system according to the invention.

When the counting value N reached by the counter C equals the threshold value $N_{ref}$ (FIG. 3), if the signal H has not yet changed state or level, the counter C is reset to zero (instant $t_2$ in FIG. 3). The counting by the counter C then restarts as soon as further switching of the position signal H takes place (instant $t_3$ in FIG. 3). In these conditions, the switching of the switches SW1-SW4 of the DC bridge driver circuit is determined by the signal H alone, i.e. by the angular position signal of the rotor, with a duty cycle which is determined by the signal PWMS. This situation continues to apply until the signal N of the counter C reaches the level $N_{ref}$ before the next switching of the position signal H of the rotor.

The voltage which is applied when starting up, to the stator winding W is, as already stated, $V_B \times $ dcmin. The motor M is never supplied in operation with a voltage which is lower than this value in its entire operative field, unless an abnormal condition occurs, as will be described hereinafter.

In operation, when starting up, after the first level switching of the signal H (instant $t_1$), the circuit PC2 measures the time Tf which elapses between this first switching and the next switching of the signal H (Tf=$t_3-t_1$). The value of the voltage $V_W$ to be applied to the stator winding W of the motor is thus calculated as follows:

$$V_W = \max[(V_B \times dcmin); (V_B \times dcmax - KTf)] = V_B \cdot dclim$$

where dcmax is equal to 0.99, k is a predetermined constant, and dclim is the duty cycle of the limit voltage.

Figure 4:
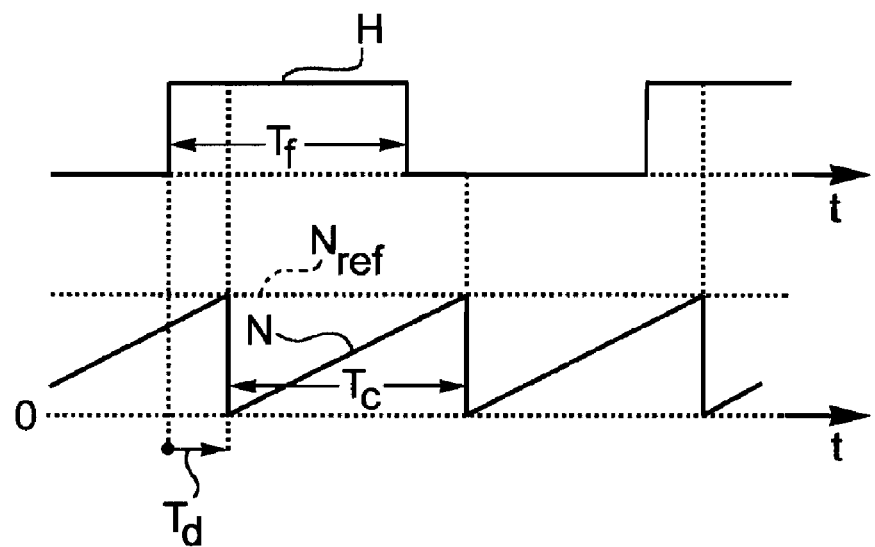

In FIGS. 3 and 4, Tc indicates the time in which the counter C of the circuit PC2 goes from the counting value 0 to the counting value N=$N_{ref}$.

As soon as a condition occurs in which $T_f \leq Tc$, the switching of the voltage to the winding W of the stator of the motor no longer takes place at a front of the position signal H, but when the signal N at the output of the counter reaches the value $N_{ref}$ (FIG. 4). In this case, the signal N of the counter C oscillates in the form of a triangular wave between zero and $N_{ref}$, and is delayed compared with the position signal H of the rotor R by a time Td.

The circuit PC2 is designed to verify whether the delay time Td is shorter than a minimum predetermined value Tdmin: in this case, the voltage applied to the stator winding W of the motor M in a generic step N remains unvaried; otherwise, if Td is longer than Tdmin, the voltage on the winding W is reduced by a quantity $\Delta V_S$, so as to bring Td to a value shorter than Tdmin. Thus, the voltage to be applied to the winding W in this case will be:

$$V_W = V_W - V_S$$

where $V_S = \Sigma \Delta V_S$; ($V_{Sn} = b_{Sn-1} + \Delta V_S$).

If the delay Td changes sign, i.e. if the position signal H is delayed compared with the signal N of the counter C (FIG. 3, left-hand part), then the voltage $V_S$ is decreased by $\Delta V_S$ for as many times as Td returns (with its own sign) to Tdmin. If this does not happen, then $V_S$ is decreased by $\omega V_S$ until $V_S = 0$ is reached, and the voltage applied to the stator winding W is equal to $V_W$.

To summarise the foregoing information, the electronic control circuit ECS is designed, when the motor M is started up, to control the DC bridge circuit on the basis of the position signal H of the rotor, and so as to apply to the stator winding W a voltage with a value which is reduced by a predetermined amount (dcmin) compared with the output voltage $V_B$ of the rectifier circuit RC.

Subsequently, starting from the first passage of the rotor R to a predetermined angular position, the control circuit CC generates a counting signal N which varies according to a linear function of the time t, and resets this counting signal N when it reaches a predetermined reference value ($N_{ref}$) corresponding to the speed of rotation $\omega_{ref}$ required for the motor M.

The control circuit CC thus controls the DC bridge driver circuit selectively on the basis of the position signal H of the rotor, or on the basis of the counting signal N of the said counter, according to whether the speed of rotation $\omega$ is respectively less or greater than the speed required $\omega_{ref}$.

Finally, the control circuit CC is designed to control the bridge driver circuit so as to apply to the stator winding W a voltage, the absolute value of which increases according to a predetermined function as the speed of rotation $\omega$ of the rotor R increases, up to a predetermined value.

In view of the foregoing description, the control system according to the invention starts up the electric motor M as a conventional brushless motor, but applying to it a limited voltage in order to reduce the so-called inrush current and reduce the acceleration noise when starting up.

Figure 5:
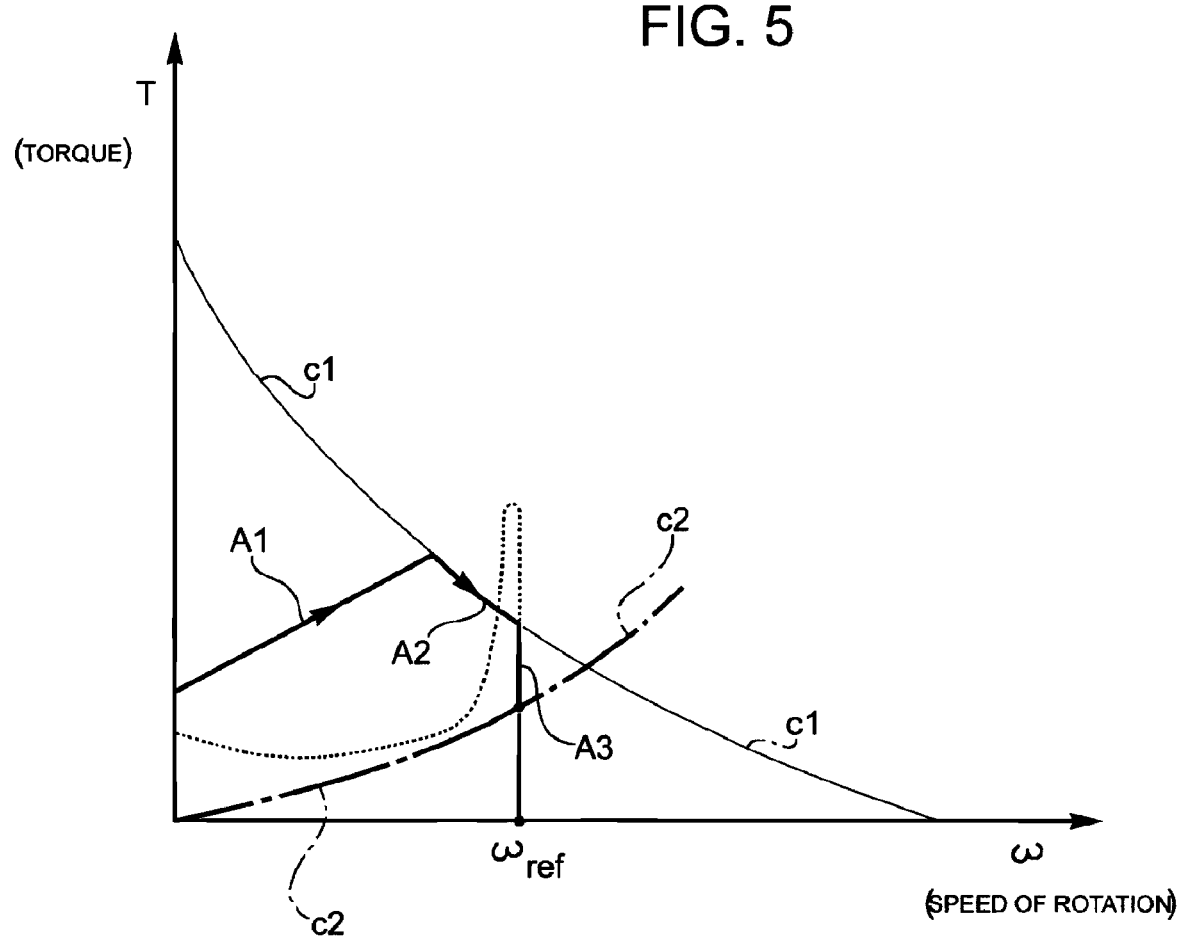
FIG. 5 is a diagram which illustrates the characteristic of functioning of an electric motor with which there is associated a control system according to the present invention.

FIG. 5 shows the characteristic of functioning of a synchronous motor controlled by a system according to the invention. In the diagram in FIG. 5, the x-axis shows the speed of rotation $\omega$ of the motor M, and the Y axis shows the torque T developed by the latter. In this diagram, the curve c1 represents the characteristic torque/speed which is typical of a synchronous motor. The curve c2 with long and short dashes represents an operative condition of load of the motor.

The curved section A1 shows the phase of starting up of the motor, in which the latter is started as a conventional brushless motor, but with limited voltage. The curved section A2 represents the phase in which the synchronous motor operates as a conventional brushless motor with permanent magnets, up to the required speed $\omega_{ref}$.

When the required speed $\omega_{ref}$ has been reached, the motor M is controlled in such a way that it operates truly as a synchronous motor, at an extremely stable speed, and without needing external rings to measure the speed. This condition is indicated by the curved section A3 in FIG. 5.

The voltage which is applied operatively to the motor can be reduced, according to the load requirements, so as to reduce the operative noise and vibrations.

It will be appreciated that, without altering the principle of the invention, the embodiments and details can be varied widely in comparison with those described and illustrated purely by way of non-limiting example, without departing from the scope of the invention as defined in the attached claims.

The invention claimed is:

1. Control system (ECS) for a synchronous electric motor (M) comprising a stator (S) with at least one winding (W) and a rotor (R) with permanent magnets;
the system (ECS) comprising:
a rectifier circuit (RC) with an input (2) which is designed to be connected to an alternating current power source, in order to supply as output a predetermined direct current voltage ($V_B$);
a driver circuit (DC), which is connected to the output of the rectifier circuit (RC) and to the stator winding (W), and includes a plurality of controlled switches (SW1-SW4) which are arranged to permit passage of a current into the stator winding (W) selectively in one direction and in the opposite direction;

position sensor means (PS) for supplying an alternating position signal (H) which is indicative of the angular position of the rotor (R); and a control circuit (CC) with a first input which is designed to receive a signal (RS) indicative of the speed of rotation required ($\omega_{ref}$) for the motor (M), and a second input which is connected to the said position sensor means (PS); the control circuit being designed to:

control the driver circuit (DC) when the motor (M) is started up, on the basis of the position signal (H) of the rotor, and so as to apply to the stator winding (W) a voltage with an absolute value which is reduced by a predetermined amount (dcmin) compared with the output voltage ($V_B$) of the rectifier circuit (RC);

then, starting with the transition of the rotor (R) to a predetermined angular position, generate a counting signal (N) which varies according to a linear time function (t) and to reset this counting signal (N) when it reaches a predetermined reference value ($N_{ref}$) corresponding to the speed of rotation required ($\omega_{ref}$) for the motor (M);

then control the driver circuit (DC) selectively on the basis of the position signal (H) of the rotor or on the basis of the said counting signal (N), when the speed of rotation ($\omega$) of the motor (M) is respectively lower and higher than the speed required ($\omega_{ref}$); and control the driver circuit (DC) so as to apply to the stator winding (W) a voltage, the absolute value of which thus increases according to a predetermined function when the speed of rotation ($\omega$) of the rotor (R) increases up to a predetermined value.

2. Control system according to claim 1, wherein the control circuit (CC) is designed to control the voltage applied to the stator winding (W) by means of a square-wave control signal with a modulated pulse width (PWMS).

3. Control system according to claim 2, wherein the control circuit (CC) comprises circuit means of the logic type (LC) which can combine in AND mode the said control signal (PWMS) and the position signal of the rotor (H) or the said counting signal (N).

4. Control system according to any one of the preceding claims, wherein the driver circuit is a bridge circuit in the form of an "H".

5. Control system according to claim 4, wherein the bridge circuit in the form of an "H" comprises a plurality of transistors of the MOSFET type (SW1-SW4).

6. Method for controlling a synchronous electric motor (M) comprising a stator (S) with at least one winding (W) and a rotor with permanent magnets (R);

the method comprising the operations of providing a predetermined direct current supply voltage ($V_B$);

applying the said direct current voltage ($V_B$) to a driver circuit (DC) which is connected to the said stator winding (W) and includes a plurality of controlled switches (SW1-SW4) which is adapted to permit passage of a current into the stator winding (W) selectively in one direction and in the opposite direction;

generating an alternating electric position signal (H) which is indicative of the angular position of the rotor (R);

controlling the driver circuit on the basis of the rotor position signal (H) and so as to apply to the stator winding (W) a voltage with an absolute value which is reduced to a predetermined extent compared with the said direct current voltage ($V_B$);

then, on the basis of the transition of the rotor (R) to a predetermined angular position, generating a counting signal (N) which varies according to a linear time function (t), and resetting this counting signal (N) when it reaches a predetermined reference value ($N_{ref}$) corresponding to a speed of rotation required ($\omega_{ref}$) for the motor (M);

then controlling the driver circuit (DC) selectively on the basis of the position signal (H) of the rotor (R) or on the basis of the said counting signal (N), when the speed of rotation ($\omega$) of the motor (M) is respectively lower and higher than the speed required ($\omega_{ref}$); and controlling the driver circuit (DC) in such a way as to apply to the stator winding (W) a voltage, the absolute value of which thus increases according to a predetermined function when the speed of rotation ($\omega$) of the rotor (R) increases, up to a predetermined value.

7. Method according to claim 6, wherein the voltage applied to the stator winding (W) is controlled by means of a square-wave signal with a modulated pulse width (PWMS).

8. Method according to claim 7, wherein the said control signal (PWMS) is combined in a logic mode with the position signal (H) of the rotor (R) or with the said counting signal (N).

9. Method according to any one of claims 6 to 8, wherein an H-bridge driver circuit is used.

10. Method according to claim 9, wherein an H-bridge driver circuit is used, comprising a plurality of transistors of the MOSFET type (SW1-SW4).

* * * * *